(12) United States Patent
Okada et al.

(10) Patent No.: US 9,030,687 B2
(45) Date of Patent: May 12, 2015

(54) PRINTING SYSTEM, JOB PROCESSING METHOD, STORAGE MEDIUM, AND PRINTING APPARATUS THAT RESTRICTS EXECUTION OF A RECEIVED PRINTING JOB UPON RECEIVING A REQUEST FOR A NON-PRINTING JOB FOR POST-PROCESSING

(75) Inventors: Hideyuki Okada, Kawasaki (JP); Kazuhiko Ushiyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 841 days.

(21) Appl. No.: 12/549,811

(22) Filed: Aug. 28, 2009

(65) Prior Publication Data

US 2010/0053679 A1 Mar. 4, 2010

(30) Foreign Application Priority Data

Aug. 29, 2008 (JP) .................................. 2008-221788

(51) Int. Cl.
| | |
|---|---|
| G06K 15/00 | (2006.01) |
| H04N 1/00 | (2006.01) |
| G03G 15/00 | (2006.01) |
| G06K 15/02 | (2006.01) |
| G06F 3/12 | (2006.01) |

(52) U.S. Cl.
CPC ............ *G06K 15/00* (2013.01); *H04N 1/00639* (2013.01); *H04N 1/00925* (2013.01); *G03G 15/6582* (2013.01); *G03G 2215/00016* (2013.01); *G06F 3/1296* (2013.01); *G06K 15/1809* (2013.01)

(58) Field of Classification Search
USPC ......................................................... 399/87
See application file for complete search history.

(56) References Cited

U.S. PATENT DOCUMENTS

| | | | | |
|---|---|---|---|---|
| 6,026,258 | A  * | 2/2000  | Fresk et al. | ...................... 399/87 |
| 7,180,637 | B2 * | 2/2007  | Tanimoto | ..................... 358/1.15 |
| 7,814,492 | B1 * | 10/2010 | Creemer et al. | ............. 718/104 |
| 2003/0020953 | A1 * | 1/2003  | Van Den Tillaart et al. | . 358/1.15 |
| 2004/0190057 | A1 | 9/2004 | Takahashi | |
| 2005/0042072 | A1 * | 2/2005 | Amdahl et al. | ............ 414/789.9 |
| 2006/0017960 | A1 * | 1/2006 | Kakigi | .......................... 358/1.15 |
| 2006/0193006 | A1 * | 8/2006 | Lawrence et al. | ............ 358/1.15 |
| 2006/0238777 | A1 * | 10/2006 | Anno et al. | ..................... 358/1.1 |
| 2006/0238786 | A1 * | 10/2006 | Sakura et al. | .................. 358/1.9 |

(Continued)

FOREIGN PATENT DOCUMENTS

| | | |
|---|---|---|
| JP | 2002-215351 A | 8/2002 |
| JP | 2005-031306 A | 2/2005 |

(Continued)

*Primary Examiner* — Nicholas Pachol

(74) *Attorney, Agent, or Firm* — Rossi, Kimms & McDowell LLP

(57) ABSTRACT

A printing system high in flexibility and/or user-friendliness which make it possible to use only post processing by a post-processing unit connected to a printing unit without requiring printing by the printing unit. An execution request receiving unit receives a request for execution of one of an inline job requiring post processing by the sheet processing unit after execution of printing by the printing unit, and an offline job requiring post processing by the sheet processing unit connected to the printing unit, without requiring printing by the printing unit. A controller performs control such that the offline job is executed by the sheet processing unit prior to an inline job associated with an execution request received earlier by the execution request receiving unit than an execution request associated with the offline job.

7 Claims, 10 Drawing Sheets

(56) References Cited

U.S. PATENT DOCUMENTS

| | | | |
|---|---|---|---|
| 2006/0262347 A1* | 11/2006 | Ono | 358/1.15 |
| 2007/0081180 A1* | 4/2007 | Abiko | 358/1.15 |
| 2007/0171454 A1* | 7/2007 | Takahashi et al. | 358/1.15 |
| 2007/0171455 A1* | 7/2007 | Tominaga | 358/1.14 |
| 2008/0174793 A1* | 7/2008 | Mutsuno | 358/1.6 |
| 2009/0027722 A1* | 1/2009 | Tsujimoto | 358/1.15 |
| 2010/0002252 A1* | 1/2010 | Yamaguchi et al. | 358/1.15 |
| 2010/0315657 A1* | 12/2010 | Tokashiki et al. | 358/1.5 |

FOREIGN PATENT DOCUMENTS

| | | |
|---|---|---|
| JP | 2005-246870 A | 9/2005 |
| JP | 2008-149686 A | 7/2008 |

* cited by examiner

SELECTION OF SHEET PROCESSING TYPE
(ONLY SHEET PROCESSING)

PLEASE SELECT TYPE OF SHEET PROCESSING TO BE PERFORMED FOR JOB TO BE PROCESSED

| STAPLING | PUNCHING | CUTTING |

| SADDLE STITCH | FOLDING |

GLUE BINDING (CASE BINDING)

INSERT PROCESSING

CANCEL       OK

PRINTING SYSTEM, JOB PROCESSING METHOD, STORAGE MEDIUM, AND PRINTING APPARATUS THAT RESTRICTS EXECUTION OF A RECEIVED PRINTING JOB UPON RECEIVING A REQUEST FOR A NON-PRINTING JOB FOR POST-PROCESSING

BACKGROUND OF THE INVENTION

1. Field of the Invention

The present invention relates to a printing system, a job processing method, a storage medium, and a printing apparatus, which enable a post-processing unit connected to a printing unit to execute only post processing without requiring printing by the printing unit.

2. Description of the Related Art

Recently, a POD (Print On Demand) printing system using an electrophotographic printing apparatus or an inkjet printing apparatus has been proposed so as to outdo the conventional printing industry (see e.g. US Published Application No. 20040190057). The POD printing system of this type makes it possible to dispense with an operation for preparing a final copy for printing and other complicated operations.

However, there is still a lot to be studied before such a POD printing system is made commercially available i.e. put into practical use. For example, the conventional printing systems are not configured such that post processing by an inline finisher connected to a printer (i.e. a finisher having a sheet path connected to the printer) can be used without requiring printing by the printer.

From the above viewpoint, a technique should be proposed while considering beforehand a possibility that it will be demanded in the future to use only post processing by a post-processing unit connected to a printing unit without requiring printing by the printing unit. However, since such a demand is not strong in actuality, no effective proposal has ever been seen.

SUMMARY OF THE INVENTION

The present invention provides a printing system, a job processing method, and a printing apparatus, high in flexibility and/or user-friendliness, and a storage medium storing a program for executing the job processing method, which make it possible to use only post processing by a post-processing unit connected to a printing unit without requiring printing by the printing unit. Further, the present invention provides a printing system, a job processing method, a storage medium storing a program for executing the job processing method, and a printing apparatus, which make it possible to effectively process jobs requiring post processing after execution of printing (hereinafter referred to as "inline jobs") as well as jobs requiring only post processing without requiring printing (hereinafter referred to as "offline jobs").

Furthermore, the present invention provides a printing system, a job processing method, a storage medium storing a program for executing the job processing method, and a printing apparatus, which make it possible to suppress occurrence of a trouble that productivity of inline jobs is wastefully reduced due to the configuration enabling the offline jobs to be processed.

In a first aspect of the present invention, there is provided a printing system that conveys sheets printed by a printing unit to a sheet processing unit connected to the printing unit and causes the sheet processing unit to perform post processing on the sheet, comprising a receiving unit configured to receive a request for execution of one of an inline job requiring post processing by the sheet processing unit after execution of printing by the printing unit, and an offline job requiring post processing by the sheet processing unit connected to the printing unit, without requiring printing by the printing unit, and a control unit configured to perform control such that the offline job is executed by the sheet processing unit prior to an inline job associated with an execution request received earlier by the receiving unit than an execution request associated with the offline job.

In a second aspect of the present invention, there is provided a job processing method comprising receiving a request for execution of one of an inline job requiring post processing by a sheet processing unit after execution of printing by a printing unit, and an offline job requiring post processing by the sheet processing unit connected to the printing unit, without requiring printing by the printing unit, and performing control such that the offline job is executed by the sheet processing unit prior to an inline job associated with an execution request received earlier than an execution request associated with the offline job.

In a third aspect of the present invention, there is provided a computer-readable storage medium for causing a computer to execute a job processing method, wherein the job processing method comprises receiving a request for execution of one of an inline job requiring post processing by a sheet processing unit after execution of printing by a printing unit, and an offline job requiring post processing by the sheet processing unit connected to the printing unit, without requiring printing by the printing unit, and performing control such that the offline job is executed by the sheet processing unit prior to an inline job associated with an execution request received earlier than an execution request associated with the offline job.

In a fourth aspect of the present invention, there is provided a printing apparatus configured to be applicable to the printing system described above, comprising the printing unit, the receiving unit, and the control unit.

According to the present invention, it is possible to provide a flexible and/or user-friendly mechanism configured to make it possible to use only post processing by the post-processing unit connected to the printing unit, without requiring printing by the printing unit. This mechanism is capable of suppressing occurrence of a trouble that productivity of inline jobs is wastefully reduced due to a configuration enabling the offline jobs to be processed. In short, the present invention provides a mechanism which makes it possible to process both the offline jobs and the inline jobs with high productivity.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing an embodiment thereof.

Figure 1:
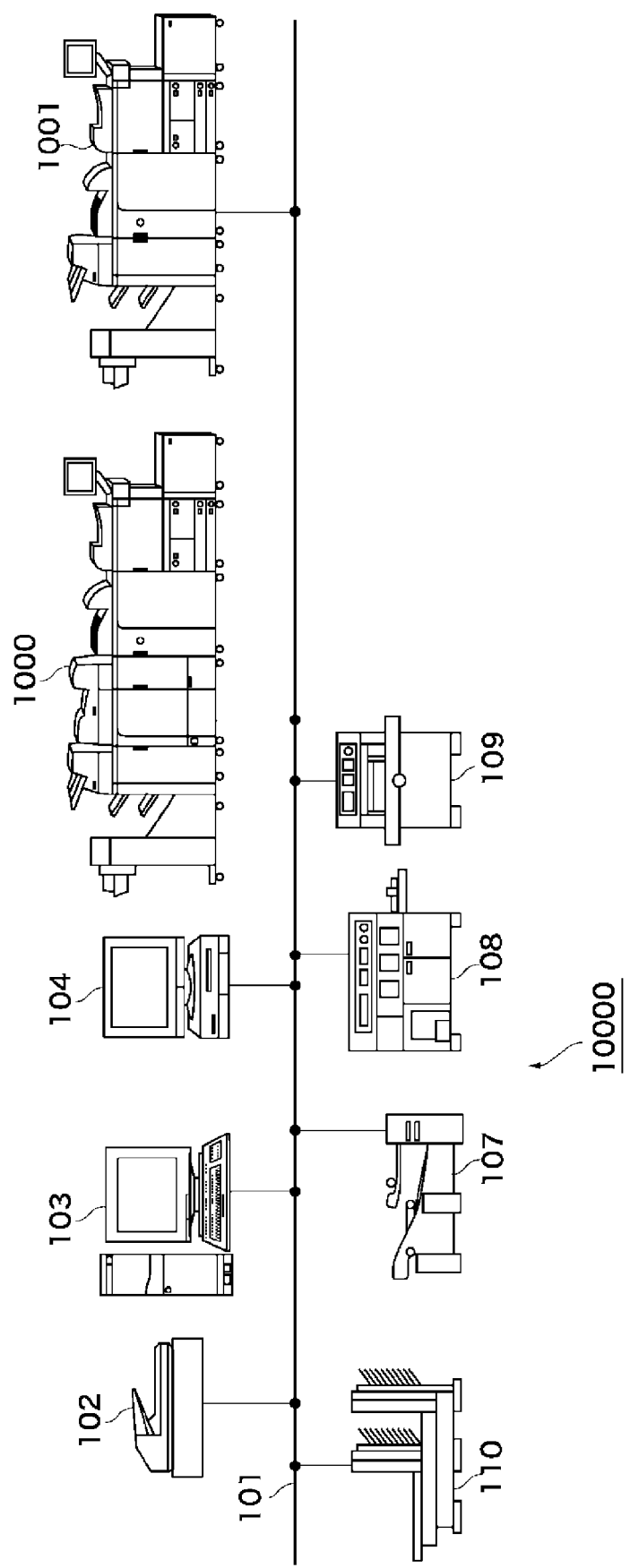
FIG. 1 is a diagram useful in explaining an overall POD system.

A POD system 10000 shown in FIG. 1 includes printing systems 1000 and 1001, a scanner 102, a server computer 103 (hereinafter referred to as "the PC 103"), and a client computer 104 (hereinafter referred to as "the PC 104"), which are interconnected via a network 101. Further, the POD system 10000 includes a sheet folding machine 107, a cutting machine 109, a saddle stitching machine 110, and a case binding machine 108.

Figure 2:
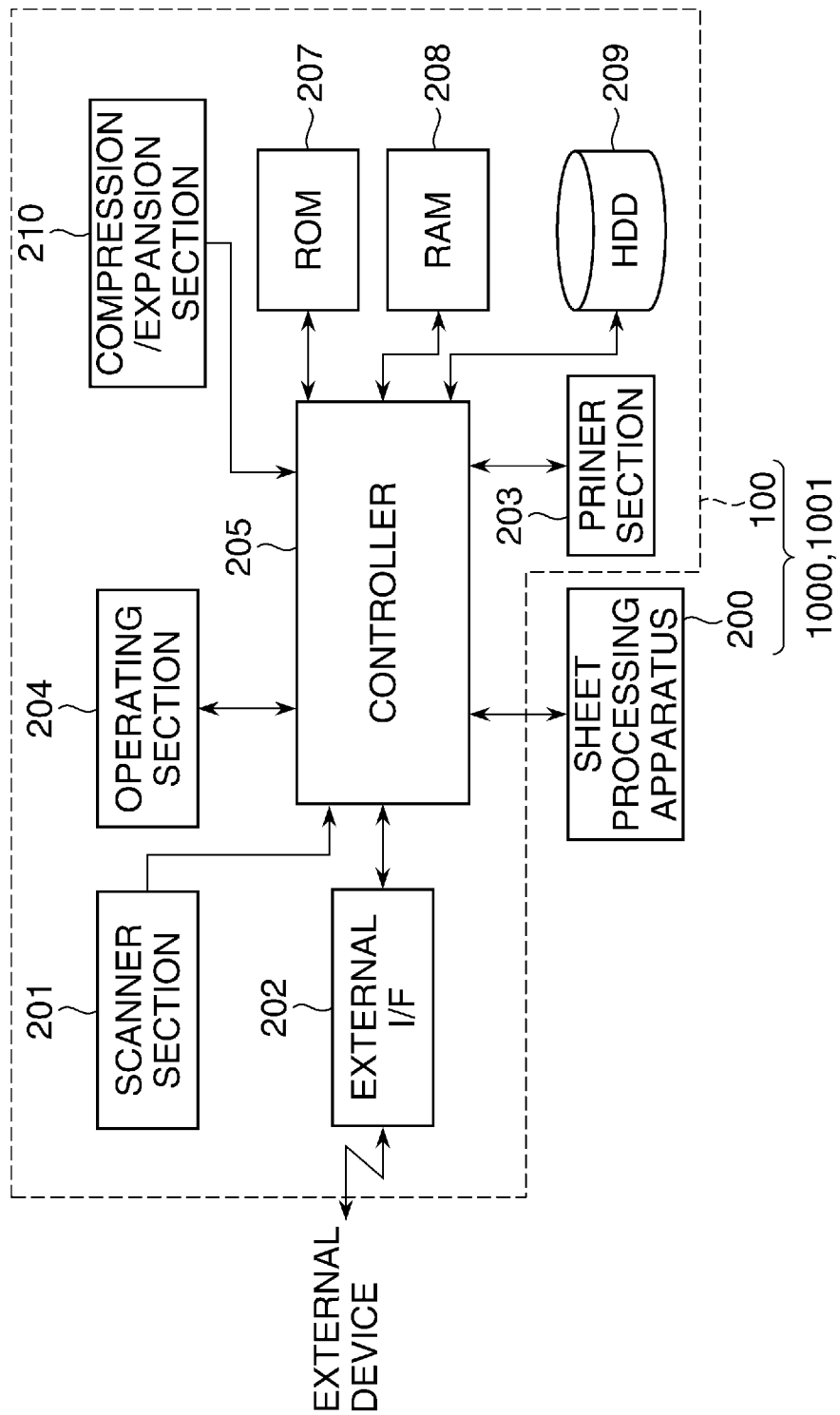
FIG. 2 is a diagram useful in explaining the internal configuration of a printing system.

Referring to FIG. 2, each of the printing system 1000 and 1001 is comprised of a printing apparatus 100 and a sheet processing apparatus 200. In the present embodiment, the printing apparatus 100 will be described based on an example in which it is implemented by an MFP (Multi-Function Peripheral) equipped with a plurality of functions including a copying function and a printing function. However, the printing apparatus 100 may be a single-function printing apparatus having only the copying function or the printing function.

The PC 103 manages transmission and reception of data to and from various apparatuses connected to the network 101. The PC 104 transmits image data to the printing apparatus 100 or the PC 103 via the network 101. The sheet folding machine 107 performs folding of sheets printed by the printing apparatus 100. The case binding machine 108 performs case binding of sheets printed by the printing apparatus 100. The cutting machine 109 performs cutting of each sheet bundle formed by sheets printed by the printing apparatus 100. The saddle stitching machine 110 performs saddle-stitch processing on each sheet bundle formed by sheets printed by the printing apparatus 100.

In the case of using the sheet folding machine 107, the case binding machine 108, the cutting machine 109, or the saddle stitching machine 110, a user takes out a bundle of printed sheets from the printing system 1000 or 1001 and sets the same in the machine so as to cause the machine to perform its processing. The machines and apparatuses included in the POD system 10000 in FIG. 1 except the saddle stitching machine 110 are connected to the network 101 such that they can perform data communication with each other.

Although in the present embodiment, the printing system 1001 has the same mechanism as that of the printing system 1000, this is not limitative. Further, the functions of the present embodiment can be realized if only either of the printing systems exists. In the present embodiment, it is assumed that the printing system 1000 is provided with various functions described below.

Next, the configuration of the printing system 1000 will be described with reference to the FIG. 2 system block diagram.

Various units or components included in the printing system 1000 shown in FIG. 2 belong to the printing apparatus 100 except the sheet processing apparatuses 200. The printing apparatus 100 can have a desired number of sheet processing apparatuses 200 connected thereto.

The printing system 1000 (1001) is configured to be capable of causing the sheet processing apparatuses 200 connected to the printing apparatus 100 to execute sheet processing on sheets printed by the printing apparatus 100. It should be noted that it is possible to form the printing system 1000 by the printing apparatus 100 alone without connecting the sheet processing apparatuses 200 to the printing apparatus 100.

Each of the sheet processing apparatuses 200 is communicable with the printing apparatus 100, and is capable of performing sheet processing, i.e. post processing, described hereinafter, in response to an instruction from the printing apparatus 100. A scanner section 201 reads an image from an original and converts the image into image data, followed by transferring the image data to another unit. An external interface (I/F) 202 exchanges data with other apparatuses connected to the network 101. A printer section 203 prints an image on a sheet based on input image data.

An operating section 204 has a hard key input section (key input section) 402 and a touch panel section 401, described hereinafter with reference to FIG. 6, and receives instructions from the user via the hard key input section 402 or the touch panel section 401. Further, the operating section 204 performs various kinds of display on the touch panel section 401. On the touch panel section 401 are displayed a copy key 601, a send key 602, a box key 603, an option key 604, an automatic color selection key 605, and a direct/zoom key 608. Further, on the touch panel section 401 are displayed a sheet processing configuration key 609, a double-sided printing key 614, a sheet selection key 615, a system status/stop key 617, an application mode key 618, etc. The key input section 402 is provided with a power key 501, a start key 503, a stop key 502, a user mode key 505, and a ten-key pad 506.

A controller 205 performs centralized overall control of the processing and operations of the respective units included in the printing system 1000 or 1001. More specifically, the controller 205 controls not only the operation of the printing apparatus 100, but also that of each of the sheet processing apparatuses 200 connected to the printing apparatus 100. A ROM 207 stores various computer programs to be executed by the controller 205. For example, the ROM 207 stores programs for causing the controller 205 to execute processes of respective flowcharts, described hereinafter, and a display control program required for displaying various kinds of configuration screens, described hereinafter. Further, the ROM 207 stores a program for causing the controller 205 to perform an operation for interpreting PDL (Page Description Language) code data received from the PC 103, the PC 104, or the like, and converting the data into raster image data. Furthermore, the ROM 207 stores a boot sequence program, font information, etc.

A RAM 208 stores image data sent from the scanner section 201 or the external interface (I/F) 202, various kinds of programs loaded from the ROM 207, and configuration information. Further, the RAM 208 stores information concerning the sheet processing apparatuses 200 (including the number (0 to n) of the apparatuses connected to the printing apparatus 100, information concerning the functions of each of the sheet processing apparatuses 200, the connection order of the sheet processing apparatuses 200, and so forth).

A HDD (hard disk drive) 209 includes a hard disk and a drive section that reads/writes data from/into the hard disk. The HDD 209 is a large-capacity storage device for storing image data that is input from the scanner section 201 or the external interface 202 and is compressed by a compression/expansion section 210. The controller 205 is capable of causing the printer section 203 to print image data stored in the HDD 209, based on instructions from the user.

Further, the controller 205 is capable of sending image data stored in the HDD 209 to an external device, such as the PC 103, via the external interface 202 based on instructions from the user. Similarly, the controller 205 is capable of receiving image data from an external device, such as the PC 103, via the external interface 202. Furthermore, the controller 205 is capable of searching an external device connected to the network 101, via the external interface 202.

The compression/expansion section 210 compresses/expands image data and the like stored in the RAM 208 or the HDD 209 using one of various kinds of compression methods including JBIG and JPEG.

Figure 3:
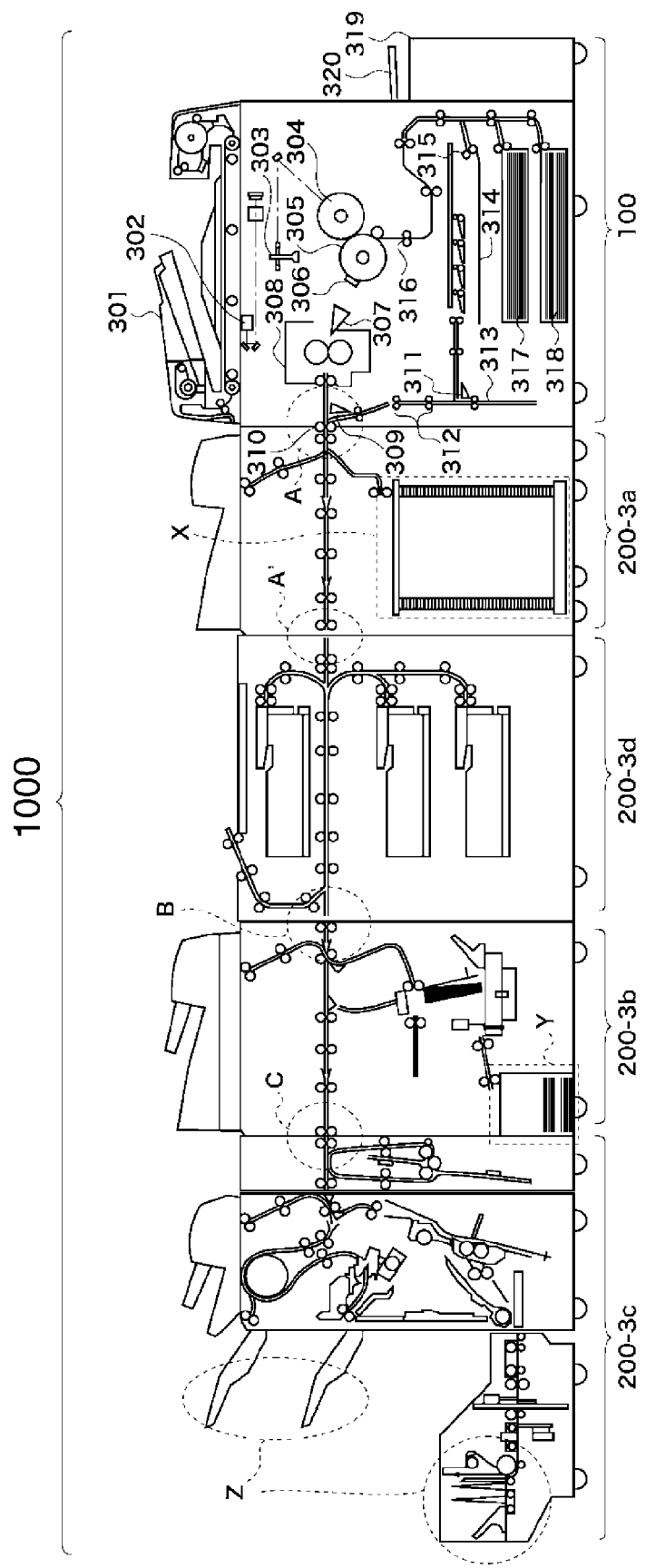
FIG. 3 is a view useful in explaining the configuration of the printing system.

Next, the configuration of the printing system 1000 will be described with reference to FIG. 3. FIG. 3 is a cross-sectional view of the printing apparatus 100 and the sheet processing apparatus 200 connected to the printing apparatus 100.

An automatic document feeder (ADF) 301 sequentially separates sheets of an original bundle set on the sheet stacking surface of a document tray, one by one in order from a first page, and conveys the separated sheets one by one onto an original platen glass for scanning by the scanner section 302. The scanner section 302 reads an image from an original conveyed onto the original platen glass and converts the image into image data by a CCD (Charge Coupled Device). A rotary polygon mirror 303 receives light, such as a laser beam, modulated according to the image data, and emits the light onto a photosensitive drum 304 via a reflective mirror as reflected scanning light. A latent image formed on the photosensitive drum 304 by the laser beam is developed by toner, and the developed toner image is transferred onto a sheet fed via a registration roller 316 and wrapped around a transfer drum 305.

This sequential image forming process is carried out sequentially using yellow (Y) toner, magenta (M) toner, cyan (C) toner, and black (K) toner in the mentioned order, whereby a full-color image is formed. After execution of the four image forming processes, the sheet having the full-color image formed thereon is separated from the transfer drum 305 by a separation claw 306, and is conveyed to a fixing device 308 by a pre-fixing conveyor 307.

The fixing device 308 is formed by rollers and a belt. The fixing device 308 incorporates a heater, such as a halogen heater, and dissolves toner of the toner image transferred on the sheet, by heat and pressure, to thereby fix the toner image on the sheet. A discharge flapper 309 is configured to be swingable about a swing shaft to regulate a sheet conveying direction. When the discharge flapper 309 has swung in a clockwise direction as viewed in FIG. 3, a sheet is conveyed straight to be discharged out of the apparatus by a discharge roller pair 310. The controller 205 controls the printing apparatus 100 to execute the above-mentioned series of sequences to thereby perform single-sided printing.

On the other hand, in the case of forming images on the respective opposite sides of a sheet, the discharge flapper 309 swings in a counterclockwise direction as viewed in FIG. 3, to change a sheet conveying direction downward, whereby a sheet is conveyed into a double-sided-printing conveyor. The double-sided-printing conveyor is comprised of an inversion flapper 311, inversion rollers 312a and 312b, an inversion guide 313, and a double-sided tray 314. The inversion flapper 311 swings about a swing shaft to regulate a sheet conveying direction.

In the case of processing a double-sided printing job, the controller 205 swings the inversion flapper 311 in the counterclockwise direction as viewed in FIG. 3 to thereby convey a sheet having an image formed on a first side thereof in the printer section 203 to the inversion guide 313 via the inversion rollers 312a. Then, the controller 205 temporarily stops the inversion rollers 312b in a state nipping the trailing end of the sheet, and then causes the inversion flapper 311 to swing in the clockwise direction as viewed in FIG. 3. Subsequently, the controller 205 causes the inversion rollers 312b to perform reverse rotation. Thus, the controller 205 causes the sheet to be conveyed in a switched-back manner, whereby the sheet is guided onto the double-sided tray 314 with its leading and trailing ends reversed.

The sheet guided into the double-sided tray 314 is temporarily placed thereon, and is then conveyed to the registration roller 316 again by refeed rollers 315. At this time, the sheet is conveyed with a reverse side thereof opposite to the first side in a facing relation to the photosensitive drum 304. Then, a second-side image is formed on the second side (reverse side) of the sheet by processes similar to those for the first side. The sheet having the images formed on the both sides thereof goes through the fixing process by the fixing device 308, and is discharged out of the printing apparatus 100 via the discharge roller pair 310. The controller 205 controls the printing apparatus 100 to execute the above-mentioned series of sequences to thereby perform double-sided printing.

The printing apparatus 100 has feeder sections each containing sheets necessary for printing. The feeder sections include sheet feed cassettes 317 and 318 (each of which is capable of containing e.g. 500 sheets), a sheet feed deck 319 (which is capable of containing e.g. 5000 sheets), and a manual feed tray 320. The sheet feed cassettes 317 and 318 and the sheet feed deck 319 are configured such that sheets of types different in size and material can be separately set in the respective feeder sections. It is possible to set various types of sheets including special sheets, such as OHP sheets, on the manual feed tray 320. Each of the sheet feed cassettes 317 and 318, the sheet feed deck 319, and the manual feed tray 320 is provided with a feed roller, and sheets therein are continuously fed one by one by the feed roller.

Next, a description will be given of the sheet processing apparatuses 200 appearing in FIG. 3.

The sheet processing apparatuses 200 included in the printing system 1000 according to the present embodiment can be selected as desired from various kinds of sheet processing apparatuses to connect a desired number of them to one another insofar as sheets can be sequentially conveyed from an upstream apparatus to a downstream one through a sheet conveying path. For example, as shown in FIG. 3, a large-capacity stacker 200-3a, an inserter 200-3d, a glue binding machine 200-3b, and a saddle stitching machine 200-3c can be sequentially connected to one another in the mentioned order as viewed from the printing apparatus 100, and can be selectively used in the printing system 1000. Further, each of the sheet processing apparatuses 200 has a sheet discharging section, so that the user can take out sheets having undergone sheet processing from the sheet discharging section.

Figure 11:
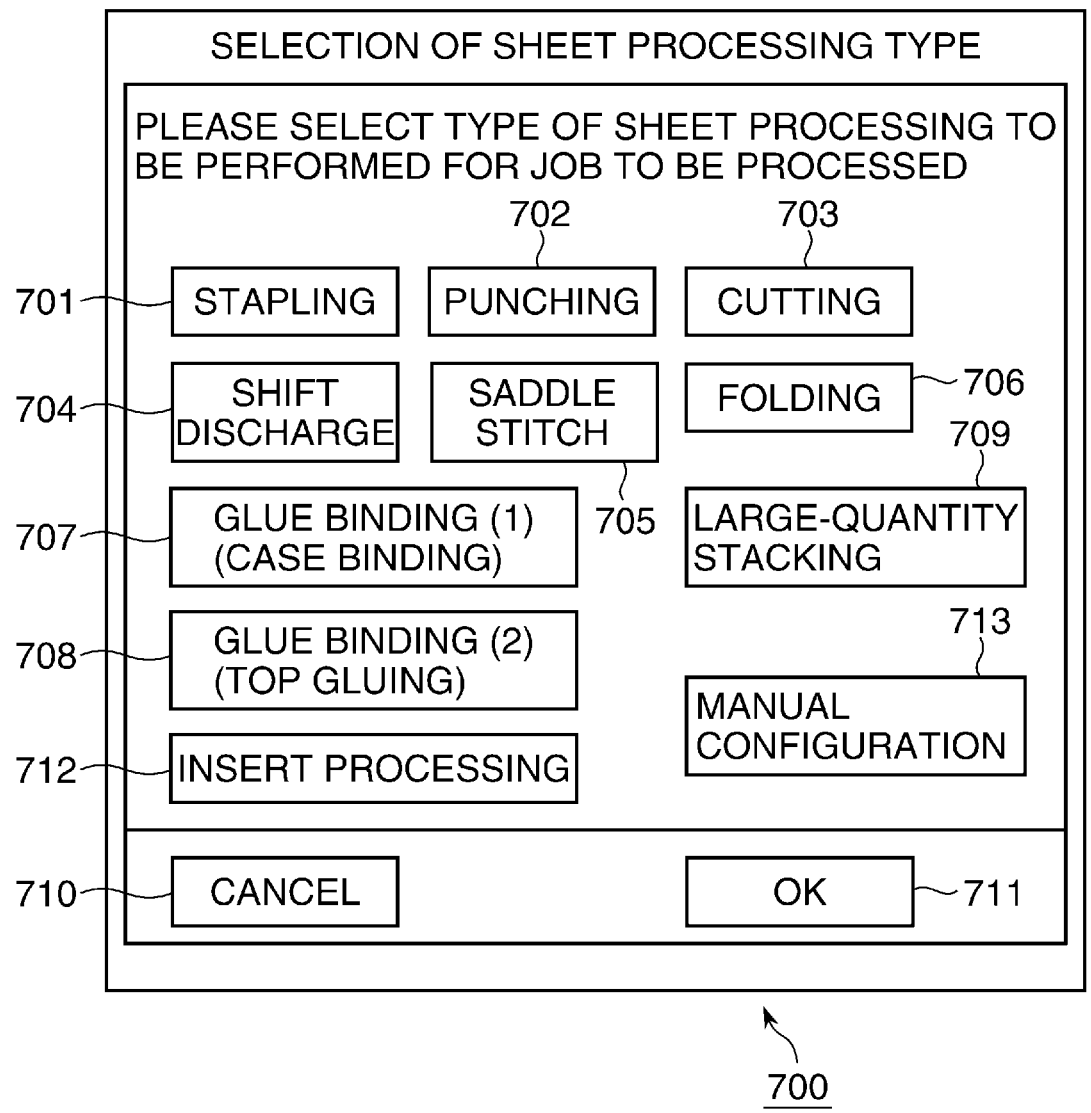
FIG. 11 is a view useful in explaining control operations via the operating section.

The controller 205 of the printing apparatus 100 receives a request for execution of sheet processing of a type selected by the user from candidates of various types of sheet processing executable by the sheet processing apparatuses 200 connected to the printing apparatus 100, via the operating section 204, together with a printing execution request. FIG. 11 is a view illustrating an example of a configuration screen displayed so as to cause the user to select the type of sheet processing to be executed on sheets printed by the printing apparatus 100. When the user presses the sheet processing configuration key 609, appearing in FIG. 6, on the screen displayed on the touch panel section 401 of the operating section 204, the controller 205 displays the screen shown in FIG. 11 on the touch panel section 401.

On the FIG. 11 screen, there are displayed a button (soft key) 701 for designating stapling, a button (soft key) 702 for designating punching, a button (soft key) 703 for designating cutting, a button (soft key) 704 for designating shift discharging, and a button (soft key) 705 for designating saddle-stitch processing. Further, there are a button (soft key) 706 for designating Z-folding, a button (soft key) 707 for designating glue binding (1) (case binding), and a button (soft key) 708 for designating glue binding (2) (top gluing). Furthermore, there are displayed a button (soft key) 709 for designating large-quantity stack processing, a button (soft key) 712 for designating insert processing, a manual configuration button (soft key) 713, a cancel button (soft key) 710, and an OK button (soft key) 711.

The controller 205 receives settings of sheet processing to be executed in a job to be processed, from the user, via this FIG. 11 screen, and causes the sheet processing apparatuses 200 to execute the sheet processing based on the settings. Then, in response to the printing execution request of the job received from the user via the operating section 204, the controller 205 causes the printer section 203 to execute print processing required for the job. Further, the controller 205 causes sheets having undergone the print processing to be conveyed through the sheet conveying path to a sheet processing apparatus which is capable of executing the sheet processing desired by the user, and causes the sheet processing apparatus to execute the sheet processing.

Let it be assumed that the printing system 1000 having a system configuration shown in FIG. 3 receives a job associated with a printing execution request from the user and that the user has designated execution of large-quantity stack processing by the large-capacity stacker 200-3a. This job is hereafter referred to as "the stacker job".

In the case of processing the stacker job in the printing system 1000 shown in FIG. 3, the controller 205 causes the printing apparatus 100 to convey sheets printed by the printing apparatus 100 into the large-capacity stacker 200-3a via a point A appearing in FIG. 3. Thereafter, the controller 205 causes the large-capacity stacker 200-3a to execute stack processing of the stacker job. Then, the controller 205 holds a printout (one set of the printed sheets) subjected to the stack processing by the large-capacity stacker 200-3a in a discharge destination X within the large-capacity stacker 200-3a, without conveying the printout to another apparatus (e.g. an apparatus disposed downstream of the printing apparatus 100).

The printout held in the discharge destination X for the stacker job can be taken out directly from the discharge destination X by the user. This eliminates the necessity of a series of apparatus operations and a user operation for conveying sheets to a discharge destination Z most downstream in the sheet conveying direction in FIG. 3 and then taking out the printout for the stacker job.

Let it be assumed that the printing system 1000 having the system configuration shown in FIG. 3 receives a job associated with a printing execution request from the user and that the user has designated execution of sheet processing (e.g. glue binding, i.e. either case binding or top gluing) by the glue binding machine 200-3b. This job is hereafter referred to as "the glue binding job".

In the case of processing the glue binding job by the system configured as shown in FIG. 3, the controller 205 causes the printing system 1000 to convey sheets printed by the printing apparatus 100 into the glue binding machine 200-3b via the point A, a point A', and a point B appearing in FIG. 3. Thereafter, the controller 205 causes the glue binding machine 200-3b to execute glue binding of the glue binding job. Then, the controller 205 holds the printout subjected to the glue binding by the glue binding machine 200-3b in a discharge destination Y within the glue binding machine 200-3b, without conveying the printout to another apparatus (e.g. an apparatus disposed downstream of the printing apparatus 100).

Further, let it be assumed that the printing system 1000 having the system configuration shown in FIG. 3 receives a job associated with a printing execution request from the user and that the user has designated execution of sheet processing by the saddle stitching machine 200-3c. Examples of sheet processing executed by the saddle stitching machine 200-3c include saddle-stitch processing, stapling, punching, cutting, shift discharging, and folding. In the present embodiment, the job associated with sheet processing by the saddle stitching machine 200-3c is hereafter referred to as "the saddle-stitch job".

In the case of processing the saddle-stitch job by the system configured as shown in FIG. 3, the controller 205 causes the printing system 1000 to convey sheets printed by the printing apparatus 100 into the saddle stitching machine 200-3c via the points A and A', the point B, and a point C. Thereafter, the controller 205 causes the saddle stitching machine 200-3c to execute the sheet processing of the saddle-stitch job. Then, the controller 205 holds the printout subjected to the sheet processing by the saddle stitching machine 200-3c in the discharge destination Z within the saddle stitching machine 200-3c.

It should be noted that the discharge destination Z is a selected one of a plurality of candidates for selection as the discharge destination Z. This is because the saddle stitching machine 200-3c is capable of executing a plurality of types of sheet processing, and different discharge destinations are used for the respective types of processing.

Further, let it be assumed that the printing system 1000 having the system configuration shown in FIG. 3 receives a job associated with a printing execution request from the user and that the user has designated execution of sheet processing by the inserter 200-3d. The job associated with sheet processing by the inserter 200-3d is hereafter referred to as "the inserter feed job". The inserter feed job can use any of the downstream sheet processing apparatuses connected to the inserter 200-3d in combination with the inserter 200-3d.

In the case of processing the inserter feed job by the system configured as in FIG. 3, the controller 205 causes sheets fed by the inserter 200-3d to be inserted between sheets printed by the printing apparatus 100 and then convey them, according to a designated type of sheet processing, to a sheet processing apparatus associated with the designated sheet processing, followed by causing the sheet processing apparatus to execute the sheet processing. In FIG. 3, the glue binding machine 200-3b and the saddle stitching machine 200-3c are sequentially connected to the inserter 200-3d disposed upstream of them, so that the inserter feed job can be processed for the glue binding job or the saddle-stitch job. It should be noted that the inserter feed job does not necessarily involve printing by the printing apparatus 100. More specifically, it is possible to convey only sheets fed from the inserter 200-3d downstream and carry out sheet processing using a designated sheet processing apparatus.

As described with reference to FIGS. 1 to 3, the printing system 1000 according to the present embodiment is configured such that a plurality of sheet processing apparatuses can be sequentially connected to the printing apparatus 100. A pattern of combination of sheet processing apparatuses to be connected to the printing apparatus 100 can be selected as desired. Further, it is possible to change the connection order of sheet processing apparatuses as desired insofar as the sheet conveying paths of the respective sheet processing apparatuses can be sequentially connected to one another. As is apparent from the above description, candidate apparatuses for connection to the printing apparatus 100 are not limited to a single kind.

The printing system 1000 according to the present embodiment is provided with a flexible and/or user-friendly mechanism which makes it possible to utilize post processing executed by a post-processing unit connected to a printing unit, without requiring printing by the printing unit.

For example, insofar as this mechanism is concerned, the printing system 1000 according to the present embodiment is provided with an execution request receiving unit for receiving a request for execution of a specific-type job in which post processing by a post-processing unit connected to the printing unit is executed without execution of printing by the printing unit.

In the present embodiment, the printer section 203 and/or the printing apparatus 100 functions as the printing unit, and a sheet processing apparatus 200 (e.g. a finisher shown in at least one of FIGS. 4, 5, and 8) connected to the printing apparatus 100 functions as the post-processing unit.

Further, in the present embodiment, a job requiring sheet processing (hereinafter referred to as "post processing") by the sheet processing apparatus 200 without requiring printing by the printer section 203 will be described as the specific-type job, by way of example. For example, a job for executing post processing by a sheet processing apparatus 200 without requiring printing by the printing apparatus 100 is handled as the specific-type job.

Thus, in the present embodiment, a job requiring execution of post processing by a sheet processing apparatus 200 independently of (in a manner asynchronous/interlocked with) print processing by the printing apparatus 100 is handled as the specific-type job. The controller 205 performs control such that the specific-type job can be processed by the printing system 1000.

Figure 4:
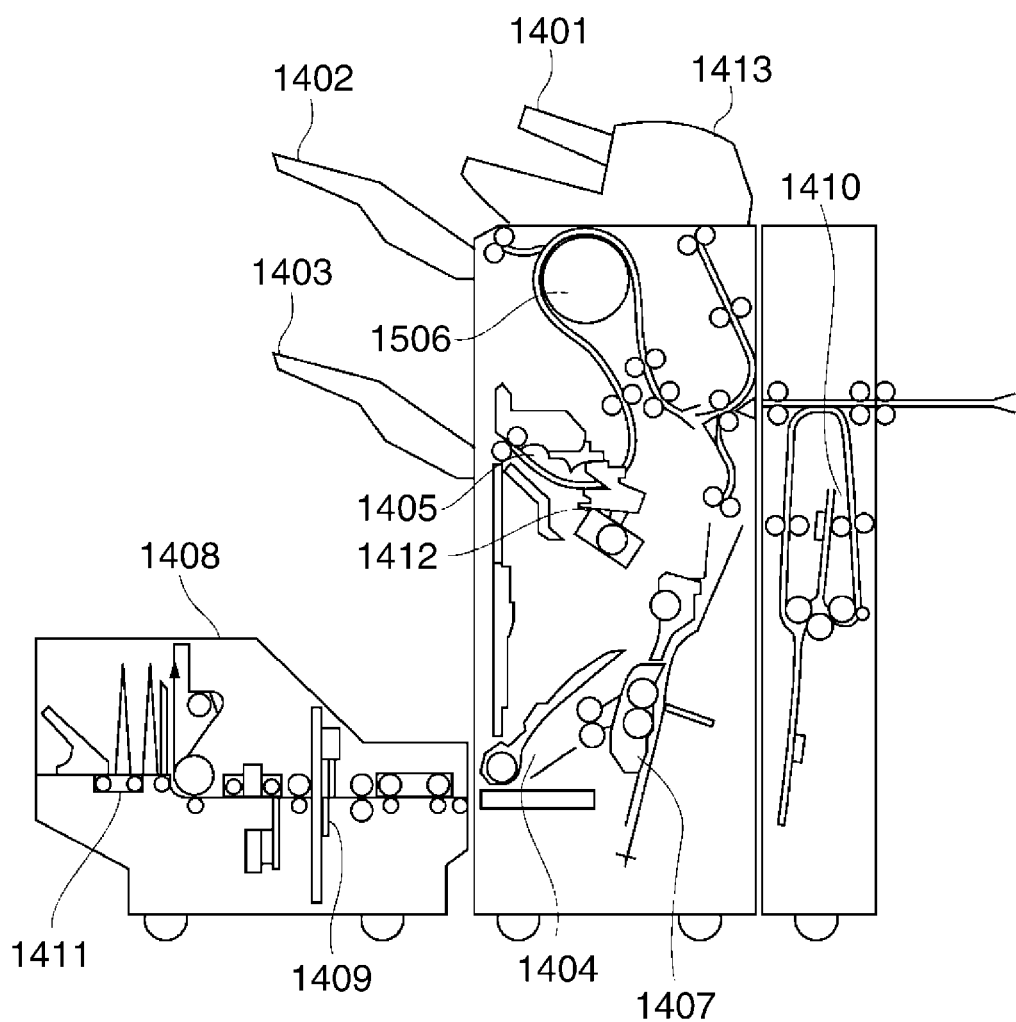
FIG. 4 is a view showing the internal construction of a saddle stitching machine.

The types of post processing permitted to be executed in the specific-type job in the present embodiment can be listed as follows:

(1) stapling
(2) punching
(3) cutting
(4) saddle-stitch processing
(5) folding
(6) case binding
(7) insert processing In the present embodiment, the post-processing operations (1) to (5) can be selectively executed by a saddle stitching machine in FIG. 4 (corresponding to the saddle stitching machine 200-3c of the sheet processing apparatuses 200 in FIG. 3). The post-processing operation (6) can be selectively carried out by a glue binding machine in FIG. 5 (corresponding to the glue binding machine 200-3b of the sheet processing apparatuses 200 in FIG. 3). Further, the post-processing operation (7) can be carried out by a large-capacity inserter in FIG. 8 (corresponding to the inserter 200-3d of the sheet processing apparatuses 200 in FIG. 3).

First, the post-processing operations (1) to (5) carried out by the saddle stitching machine 200-3c will be described with reference to FIG. 4.

The saddle stitching machine is comprised of units enabling selective execution of stapling, punching, cutting, saddle-stitch processing, and Z folding on sheets from an upstream apparatus. The saddle stitching machine is capable of not only processing sheets conveyed from the upstream apparatus, but also conveying a sheet (e.g. a printed cover sheet) set on an insert tray 1401 attached to the saddle stitching machine, by the saddle stitching machine itself, to thereby selectively perform stapling, punching, cutting, saddle-stitch processing or the like. However, in the present embodiment, the saddle stitching machine does not have a path for conveying a sheet set on the insert tray 1401 to a Z-folder 1410, as shown in FIG. 4. Therefore, the saddle stitching machine is not capable of achieving Z folding, singly by itself.

However, the saddle stitching machine is configured to be capable of conveying sheets conveyed from the upstream apparatus to the Z-folder 1410 in FIG. 4. This makes it possible to feed sheets using an inserter or the like provided on the upstream sheet processing apparatus, and cause the Z-folder 1410 in FIG. 4 to execute the sheet processing. Thus, only Z folding can be performed without using the printing apparatus 100.

The saddle stitching machine does not have a straight path which plays the role of conveying sheets to a downstream apparatus. For this reason, in a case where a plurality of sheet processing apparatuses are connected to the printing apparatus 100, the saddle stitching machine is disposed at the most downstream position as shown in FIG. 3. Further, as shown in FIG. 4, the saddle stitching machine has a sample tray 1402 and a stack tray 1403 attached to the outside thereof, and has a booklet tray 1404 provided therein.

When instructed to perform stapling by the saddle stitching machine, the controller 205 performs control such that sheets set on the insert tray 1401 are conveyed and sequentially stacked on a processing tray 1405 disposed in the saddle stitching machine. Then, when sheets corresponding in number to one bundle are stacked on the processing tray 1405, the controller 205 causes a stapler 1412 to perform stapling. Thereafter, the controller 205 performs control such that the stapled sheet bundle is discharged from the processing tray 1405 onto the stack tray 1403 shown in FIG. 4.

When instructed to perform punching by the saddle stitching machine, the controller 205 performs control such that sheets set on the insert tray 1401 are conveyed, and causes a puncher 1406 to punch the sheets. Then, the controller 205 performs control such that the punched sheets are conveyed through the saddle stitching machine to be discharged onto a discharge tray, i.e. the stack tray 1403 or the sample tray 1402.

When instructed to execute saddle-stitch processing by the saddle stitching machine, the controller 205 performs control such that sheets set on the insert tray 1401 ate conveyed to a saddle stitcher 1407. Then, the controller 205 causes the saddle stitcher 1407 to stitch a central portion of a sheet bundle formed by sheets corresponding in number to one set, at two locations on the central portion. Thereafter, the controller 205 causes a roller to come into contact with the central portion of the sheet bundle to fold the sheet bundle in half about the central portion. Thus, the sheet bundle can be bound into a booklet form. The sheet bundle subjected to the saddle-stitch processing by the saddle stitcher 1407 is conveyed to the booklet tray 1404.

When instructed to perform cutting on a job including saddle-stitch processing, the controller 205 performs control such that a saddle-stitched sheet bundle is conveyed from the booklet tray 1404 to a trimmer 1408. Thereafter, the controller 205 causes a cutter section 1409 to cut the sheet bundle conveyed to the trimmer 1408, and then causes a booklet holding part 1411 to hold the sheet bundle. The saddle stitching machine shown in FIG. 4 is also configured to be capable of performing three-way cutting on a saddle-stitched sheet bundle. It should be noted that when the saddle stitching machine does not have the trimmer 1408, it is possible to take out a sheet bundle bound by the saddle stitcher 1407 from the booklet tray 1404.

When instructed to execute a job including Z folding by the saddle stitching machine, the controller 205 performs control such that sheets from the upstream apparatus are conveyed to a Z-folder 1410, and causes the Z-folder to perform Z-folding. Then, the controller 205 performs control such that the folded sheets are conveyed through the saddle stitching machine to be discharged onto a discharge tray, i.e. the stack tray 1403 or the sample tray 1402.

Next, the post-processing operation (6) executed by the glue binding machine 200-3b will be described with reference to FIG. 5.

The glue binding machine selectively conveys sheets from an upstream apparatus into one of three conveying paths. One of the conveying paths is a cover sheet-conveying path 1502, another is a book body-conveying path 1503, and the other is a straight path 1504. Further, the glue binding machine has an inserter path 1505. The inserter path 1505 is a sheet conveying path for conveying sheets set on an insert tray 1501 into the cover sheet-conveying path 1502 or the book body-conveying path 1503. The straight path 1504 of the glue binding machine shown in FIG. 5 is a sheet conveying path for conveying sheets associated with a job which does not require glue binding by the glue binding machine to a downstream apparatus. Further, the book body-conveying path 1503 and the cover sheet-conveying path 1502 of the glue binding machine shown in FIG. 5 are sheet conveying paths for conveying sheets necessitated for creation of a case-bound printout (product).

For example, when instructed to perform case binding using the glue binding machine, first, the controller 205 performs control such that sheets from the upstream apparatus are conveyed into the book body-conveying path 1503, as book-body sheets for use in the case binding. In the case of creating a case-bound printed matter corresponding to one volume, a bundle of the book-body sheets corresponding to one volume is covered by a single cover sheet. The book-body sheet bundle for case binding is hereafter referred to as "the book body".

Next, the controller 205 performs control such that a cover sheet for use in the case binding is conveyed into the cover sheet-conveying path 1502. Then, the controller 205 executes case binding on the book body conveyed through the book body-conveying path 1503 by covering the book body with the cover sheet conveyed through the cover sheet-conveying path 1502. The glue binding machine is capable of not only processing sheets conveyed from the upstream apparatus, but also conveying a sheet set on the insert tray 1501 and performing case binding or top gluing, singly by the glue binding machine itself.

For example, the controller 205 performs control such that sheets conveyed from the insert tray 1501 for forming the book body are sequentially conveyed through the book body-conveying path 1503 to be stacked in a stacker section 1506. When a number of sheets corresponding to one volume and having main-body data printed thereon are stacked in the stacker section 1506, the controller 205 performs control such that a single sheet to be used as a cover in the job is conveyed through the cover sheet-conveying path 1502. Then, the controller 205 controls a gluing section 1507, appearing in FIG. 5, to perform gluing on a spine-side edge portion of the sheet bundle as one set of sheets corresponding to the book body. Thereafter, the controller 205 causes the gluing section 1507 to glue the spine-side edge portion of the book body and the central portion of the cover sheet to each other. In the case of gluing the book body to the cover sheet, the book body is conveyed while being pressed downward in the glue binding machine. As a consequence, the cover sheet is folded in a manner covering the book body.

Figure 5:
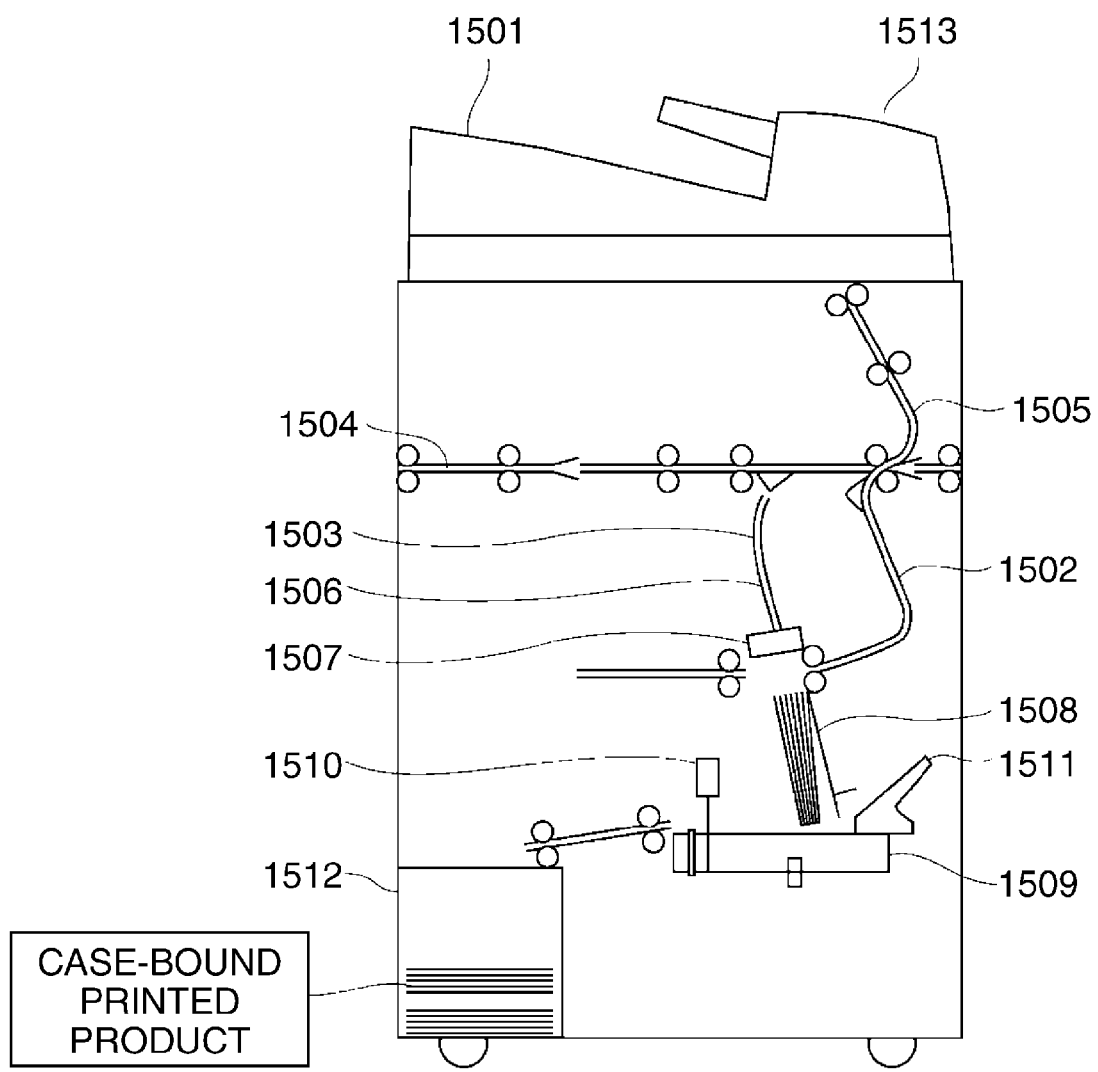
FIG. 5 is a view showing the internal construction of a glue binding machine.

Thereafter, the sheet bundle as one set of sheets is stacked on a rotary table 1509 appearing in FIG. 5, along a guide 1508. When the sheet bundle is set on the rotary table 1509, the controller 205 causes a cutter section 1510 in FIG. 5 to perform cutting on the sheet bundle. In this case, it is possible to cause the cutter section 1510 to execute three-way cutting for cutting three edges of the sheet bundle except for the spine-side edge thereof. Then, the controller 205 causes the sheet bundle having undergone the three-way cutting to be pushed out toward a basket 1512 using a free space-reducing section 1511 so as to be stored therein.

Next, the post-processing operation (7) executed by the inserter 200-3d will be described with reference to FIG. 8. The large-capacity inserter (i.e. the inserter 200-3d) is capable of not only conveying sheets received from an upstream apparatus to a downstream apparatus through a straight path 1801, but also feeding sheets set on a selected one of sheet feeders thereof using an associated feed motor, to convey the sheets downstream through the straight path 1801.

An escape path 1802 is a sheet conveying path for discharging sheets onto an escape tray 1803. The escape path 1802 is used when multiple feed is detected during sheet feed, to convey multi-fed sheets to the escape tray 1803.

It should be noted that along each of the sheet conveying paths within the large-capacity inserter, there are provided a plurality of sheet detecting sensors, not shown, for detecting the status of sheet conveyance and occurrence of a sheet jam.

The large-capacity inserter has a CPU, not shown, and the CPU sends information obtained through sheet detection by the sensors to the controller 205 via a signal line for data communication. The controller 205 grasps the status of sheet conveyance or the state of a sheet jam in the large-capacity inserter based on the information sent from the large-capacity inserter. It should be noted that when another sheet processing apparatus is disposed between the large-capacity inserter and the printing apparatus 100, a CPU, not shown, provided in the sheet processing apparatus transfers sensor information from the large-capacity inserter to the controller 205.

Now, let us consider a case where the controller 205 is instructed to perform insert processing using sheets set in one of the sheet feeders. First, book-body sheets are fed from a sheet feeder (e.g. a first feed deck 1804 appearing in FIG. 8) having the book-body sheets set therein, using an associated sheet feed motor (e.g. a first-deck sheet feed motor 1807 appearing in FIG. 8). Then, control is performed such that the book-body sheets are conveyed downstream. When book-body sheets have been fed until a designated insert position in a book body to be formed is reached, the controller 205 performs control such that a sheet to be inserted is fed from a sheet feeder (e.g. a second feed deck 1805 appearing in FIG. 8) having insert sheets set therein, using an associated sheet feed motor (e.g. a second-deck sheet feed motor 1808 appearing in FIG. 8). Then, control is performed such that the sheet to be inserted is conveyed downstream. Thus, insert processing for inserting the insert sheet into the book body is realized.

It should be noted that sheets conveyed downstream from the inserter 200-3d can be subjected to post processing by the saddle stitching machine 200-3c or the glue binding machine 200-3b, as described hereinbefore.

Further, in the present embodiment, the controller 205 performs control such that a plurality of candidates for selection as a post-processing operation permitted to be executed without requiring printing by the printing apparatus 100 are displayed on a user interface. To this end, the present embodiment is configured as described in detail hereinafter with reference to FIG. 7, by way of example.

Post-processing operations that can be executed without requiring printing are not limited to the above examples, but may include any other suitable type of post processing. Further, although in the above example, the printing system is configured to be capable of selectively executing the multiple types of post-processing operations, this is not limitative, but the printing system may be configured to be capable of executing only a single post-processing operation without requiring printing.

In the present embodiment, various user interfaces that are provided by the printing system 1000 and are configured to be interactively responsive to a user operation function as the above-mentioned execution request receiving unit. For example, the operating section 204 and/or soft keys and hard keys provided in the operating section 204, and/or various user interface screens shown in FIGS. 7 and 11 can be mentioned as examples of the execution request receiving unit. However, these are only exemplary.

For example, a request for execution of the specific-type Job may also be received by an external apparatus different from the printing system 1000. In this case, a user interface provided in an external data generating source, such as the scanner 102, the PC 103, or the PC 104, functions as a receiving unit for receiving the execution request. Further, in this case, a unit, such as the external interface 202 that the printing system 1000 necessarily uses to externally receive the specific-type job, also functions as a receiving unit for receiving the execution request.

As described above, it is possible to make various changes and modifications to the present embodiment, and therefore the present invention can be applied to any printing system insofar as it has at least a configuration equivalent to that of the printing system 1000, which will be described below.

For example, let it be assumed that the controller 205 receives a request for execution of the specific-type job via one of the above-mentioned user interfaces. In this case, in response to the execution request, the controller 205 causes an associated sheet processing apparatus 200 to execute post processing on a printout (first printout) prepared for the specific-type job, without causing the printing apparatus 100 to perform printing.

As described above, the printing system 1000 has a control unit configured to be operable when receiving the above-mentioned request for execution of the specific-type job, to cause the post-processing unit to execute the post processing on the first printout prepared for the specific-type job, without causing the printing unit to perform printing. In the present embodiment, this control unit is implemented by the controller 205.

Further, the printing system 1000 has a control unit configured to be operable when receiving a request for execution of an offline job after having received a request for execution of an inline job, to cause a post-processing unit to execute the offline job prior to the inline job, as described below in detail. In the present embodiment, this control unit as well is implemented by the controller 205.

Furthermore, the printing system 1000 has a management unit configured to manage a plurality of inline jobs for sequential execution of these, as described below in detail. In the present embodiment, this management unit as well is implemented by the controller 205.

It should be noted that in the present embodiment, each of the sheet processing apparatuses 200 themselves is provided with a predetermined supply unit configured to be capable of supplying a plurality of printing media (printout) printed in advance as the first printout. The large-capacity stacker, the saddle stitching machine, and the large-capacity inserter, which are shown as sheet processing apparatuses 200 in FIGS. 5, 4, and 8, respectively, are provided with an inserter 1413, an inserter 1513, and the first to third feed decks 1804 to 1806, respectively. In the present embodiment, each of these units not only performs the associated function described at the beginning of the present detailed description, but also functions as the predetermined supply unit (sheet feed unit). The first printout required for the specific-type job is set on a selected one of these predetermined sheet feed units by the user.

Then, in the present embodiment, when a request for execution of the specific-type job is issued by the user, the controller 205 performs control such that the first printout is supplied from the supply unit to a post-processing section within the sheet processing apparatus 200 without being passed through the printing unit. Thereafter, the controller 205 causes the post-processing section to execute the post processing on the first printout. With this method, the controller 205 can cause the sheet processing apparatus 200 to execute a post-processing operation designated by the user for the job without requiring printing by the printing apparatus 100.

It should be noted that when the specific-type job is to be executed, the first printout may be supplied from a sheet feed cassette as a predetermined supply unit provided in the printing apparatus 100. In this case, while the first printout is being guided through the conveying path in the printing apparatus 100 toward the sheet processing apparatus 200, the controller 205 performs control such that printing of the first printout by the printing apparatus 100 is disabled, and when the printout has been conveyed into the sheet processing apparatus 200, the controller 205 controls the sheet processing apparatus 200 to execute the post processing designated by the user on the printout.

Figure 9:
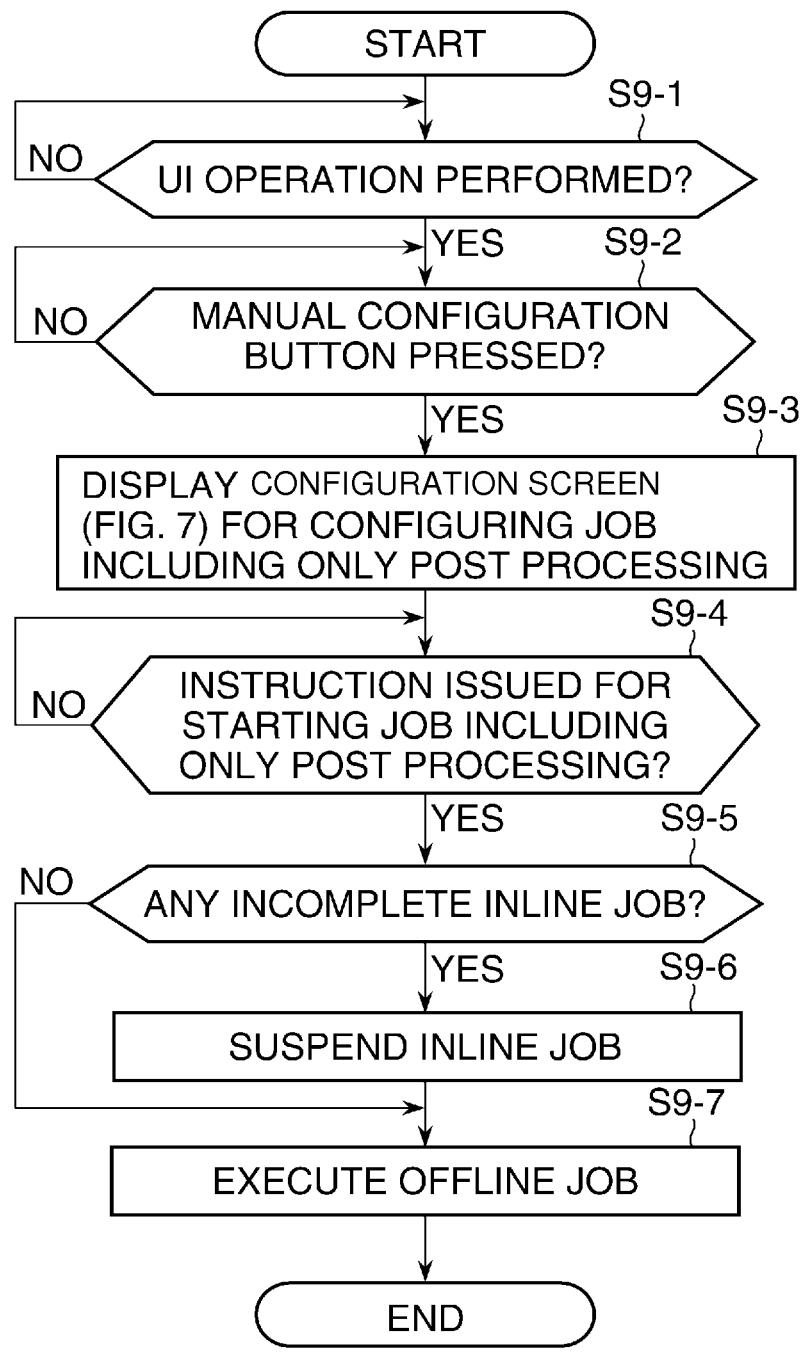
FIG. 9 is a flowchart useful in explaining an example of a control process according to an embodiment of the present invention.

Next, a control process executed in the present embodiment will be described using a flowchart in FIG. 9.

Figure 6:
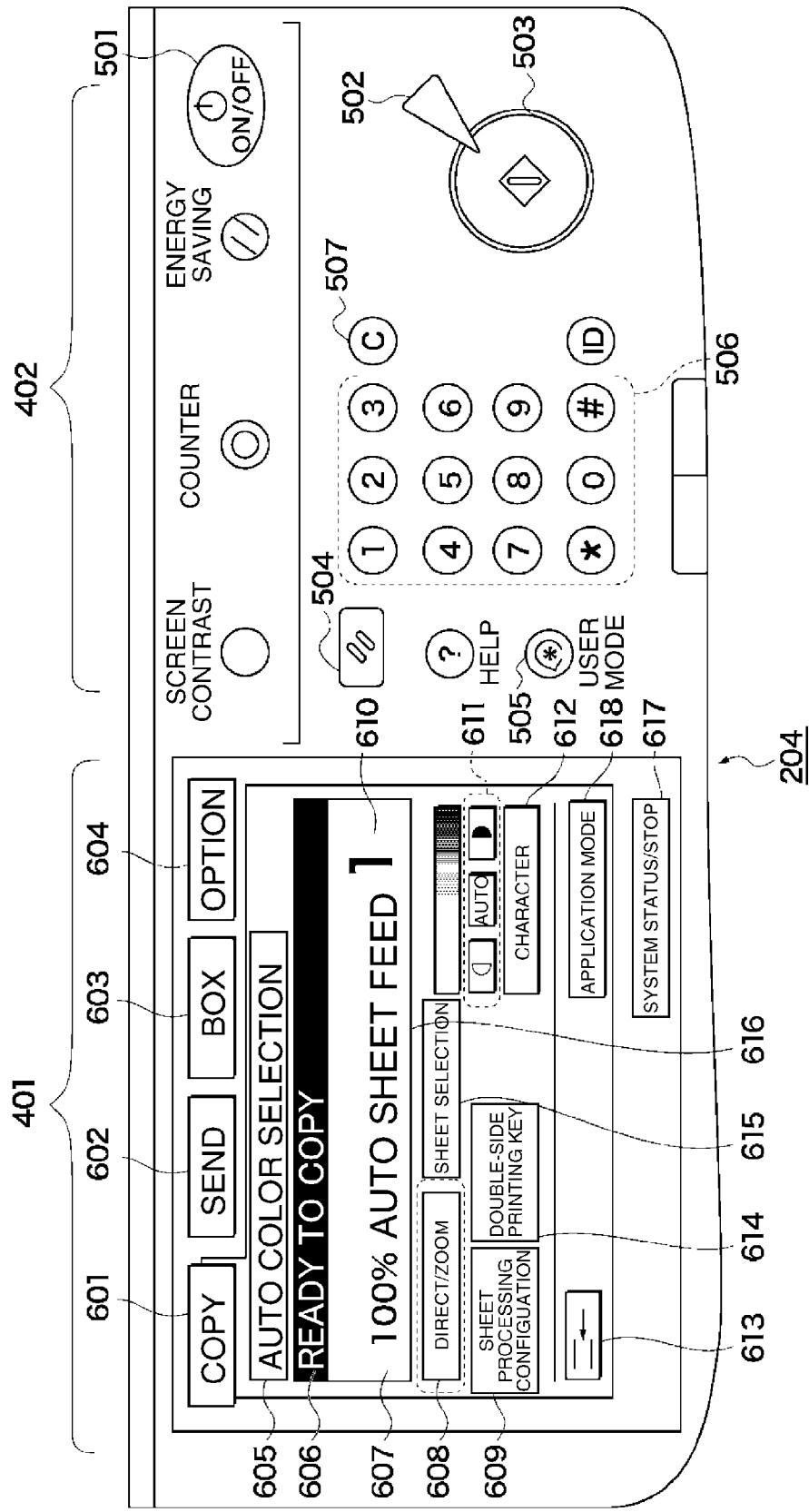
FIG. 6 is a view of an example of an operating section.

First, a user interface (UI) shown in FIG. 6 is provided in the touch panel section 401 provided in the printing system 1000. Then, the controller 205 monitors an instruction input by UI operation (step S9-1). Then, it is determined whether or not the manual configuration button 713 provided on the screen in FIG. 11 has been pressed (step S9-2). The manual configuration button 713 is used to designate processing to be executed using a sheet processing apparatus 200 alone. If the manual configuration button 713 has been pressed, the controller 205 determines that a request for execution of the processing to be executed using a sheet processing apparatus 200 alone has been issued.

Figures 7, 8:
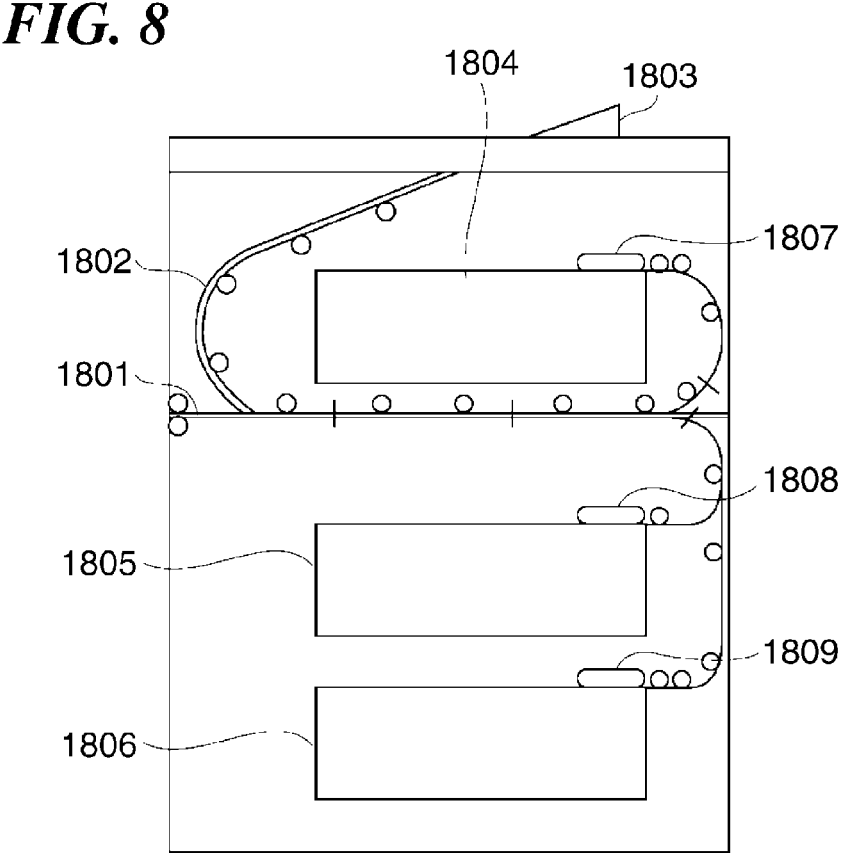
FIG. 7 is a view of an example of a user interface screen.
FIG. 8 is a view showing the internal construction of an inserter.

Next, the controller 205 displays the screen in FIG. 7 on the touch panel section 401 (step S9-3). The screen in FIG. 7 is used to select the type of sheet processing. A desired sheet-processing operation can be selected from stapling, punching, cutting, saddle-stitch processing, Z folding, glue binding (case binding), and insert processing.

The user configures sheet processing to be executed on the screen in FIG. 7, sets sheets to be used on an associated sheet feeder, and then presses the start key 503 appearing in FIG. 6. Then, the user gives an instruction for starting the configured processing. The controller 205 monitors whether or not the execution start instruction has been given (step S9-4). If the execution start instruction has been given, the controller 205 checks whether or not an incomplete inline job remains (step S9-5). An incomplete inline job means a job for which print processing has already been started in the printing system 1000, or a job awaiting the start of printing.

If no incomplete inline job remains, the controller 205 controls the printing system 1000 according to the post processing settings configured via the touch panel section 401, such that the desired sheet-processing operation can be executed by an associated sheet processing apparatus (step S9-7). On the other hand, if one or more incomplete inline jobs remain, the controller 205 controls the printing system 1000 to execute suspend processing for suspending the jobs (step S9-6). The suspend processing is executed to suspend or temporarily stop a job, and the suspended job is held in a resumable state.

The controller 205 causes the printing system 1000 to stop printing when the job is under printing, or not to start printing when the job is awaiting the start of printing. However, when stapling in the saddle stitching machine 200-3c and case binding in the glue binding machine 200-3b are designated for the job under printing, it is preferable not to stop printing for the sheet bundle halfway. In this case, the controller 205 causes the printing system 1000 to wait until the printing for the sheet bundle is completed and then stop printing.

Further, the controller 205 controls the operating section 204 such that the start key 503 in FIG. 6 is disabled from being pressed until completion of the suspend processing. Even after completion of the suspend processing, it is possible to receive a job via the external interface 202 in FIG. 2. In this case, the controller 205 controls the printing apparatus 100 to store the received job in the HDD 209 and perform compression/expansion by the compression/expansion section 210 as required.

It should be noted that control executed in the step S9-6 in the present embodiment is applied to a case described below, for example.

Now, let it be assumed that at a time point when the user inputs a request for execution of an offline job via the UI, an inline job (preceding inline job) exists as a job having already been input prior to the offline job (subsequent offline job) and that processing of this inline job has not been completed yet (i.e. this preceding inline job corresponds to an incomplete inline job). According to the present embodiment, at least in the above-described case, control in the step S9-6 is executed in response to a key operation of the manual configuration button 713 by the user.

In other words, in this case, on condition that the manual configuration button 713 has been pressed by the user, the controller 205 controls an associated one of the sheet processing apparatuses 200 such that processing of the subsequent offline job can be completed prior to processing of the preceding inline job.

Insofar as processing of the offline job and the inline job is concerned, the controller 205 controls the printing system 1000, for example, as follows: The controller 205 waits for the user to input an instruction for starting the processing of the subsequent offline job to be executed in preference to the preceding inline job, using the start key 503. Then, when the instruction is input, the controller 205 performs control such that the processing of the offline job is started with the input of the instruction as a trigger.

At this time, the controller 205 performs control such that the offline job is executed by causing the sheet processing apparatus 200 to carry out post processing on a printout prepared for the offline job, without executing printing by the printer section 203. It should be noted that during this control period, the controller 205 controls the printing system 1000 to suspend at least the processing of the preceding inline job so as to prevent the processing from being continued, and maintain this state of suspension.

After completion of the processing of the subsequent offline job, the controller 205 controls the printing system 1000 to execute the suspended processing of the preceding inline job. In the case of thus executing the inline job, the controller 205 controls the printing system 1000 such that in the inline job, post processing can be executed by an associated sheet processing apparatus 200 after execution of printing by the printer section 203.

In the present embodiment, priority is given to the subsequent offline job as described above, whereby it is possible to execute the preceding inline job later. Further, the controller 205 controls the printing system 1000, as described above, such that the printing system 1000 does not permit the start or resumption of execution of the preceding inline job postponed for preferential execution of the subsequent job until predetermined conditions are satisfied. This control will be described in detail hereinafter with reference to FIG. 10.

As described hereinabove, according to the present embodiment, the controller 205 performs control as follows: With a single action by the user of depressing the manual configuration screen 713 as a trigger, the status of a preceding inline job is immediately changed from a processing wait state to a suspended state. It should be noted that "changing the status of a preceding inline job to a suspended state" is intended to mean preventing the printing system 1000 from starting execution of an actual operation (mechanical operation), such as a print operation and/or a post-processing operation, required for the inline job.

Further, according to the present embodiment, the printing system 1000 is configured to be operable while the preceding inline job is thus held in the suspended state (i.e. during a suspension period of the preceding inline job), to receive a request for execution of a subsequent offline job. Then, when the request for execution of the subsequent offline job is issued, the controller 205 performs control such that post processing required for the offline job is executed by the sheet processing apparatus 200.

Furthermore, in the present embodiment, the control in the step S9-6 is also performed in a case where a plurality of inline jobs as jobs associated with execution requests issued prior to a request for execution of a subsequent offline job are currently processed and/or awaiting processing in the printing system 1000.

For example, let it be assumed that at a time point when the request for execution of the above-mentioned subsequent offline job is input via the UI, there exist ten inline jobs in the printing system 1000 as preceding jobs for which requests for execution have been made prior to this job. However, the ten inline jobs are assumed to be currently being processed and/or awaiting processing in the printing system 1000.

In this situation, according to the present embodiment, the controller 205 performs control as follows: When the user presses the manual configuration screen 713, the status of each of the ten preceding inline jobs currently being processed and/or awaiting processing is immediately changed to the suspended state in response to the one action by the user. When the ten preceding inline jobs are all held in the suspended state, it is possible to input a plurality of offline jobs as subsequent jobs. In this case, the controller 205 controls the printing system 1000 such that execution requests associated with the respective offline jobs can be sequentially input, and that whenever an execution request associated with one of the offline jobs is input, an associated one of the sheet processing apparatuses 200 can execute post processing required for the job.

As described above, the printing system 1000 according to the present embodiment is configured to be capable of suspending a plurality of inline jobs currently being processed and/or awaiting processing all together with the depression of the manual configuration button 713 as a trigger. Further, the printing system 1000 is capable of receiving a user-desired number of offline jobs as subsequent jobs during suspension of the inline jobs. Furthermore, the printing system 1000 is capable of sequentially executing the additionally received offline jobs during the suspension period.

Upon completion of the offline jobs, the controller 205 causes the printing system 1000 to return the status of each of the suspended inline jobs to its former state and then sequentially execute the inline jobs.

Figure 10:
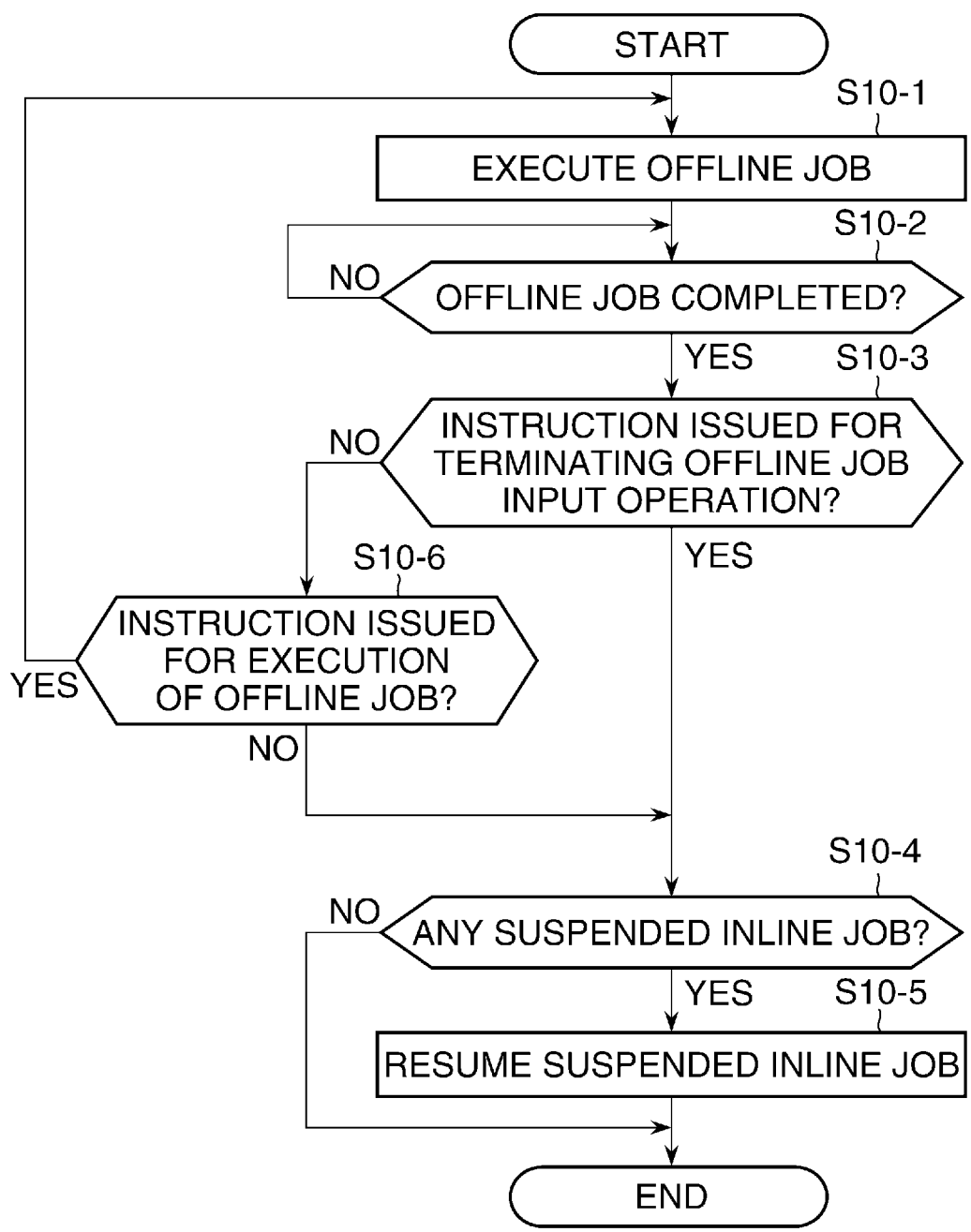
FIG. 10 is a flowchart useful in explaining an example of another control process according to the embodiment.

More specifically, to return the inline jobs to their respective former states, it is determined whether or not the predetermined conditions are satisfied, as mentioned above. If the controller 205 determines that the predetermined conditions are satisfied, control is performed such that all the inline jobs (ten in the present example) are collectively returned to their former states. The present embodiment is configured such that a control process described below with reference to FIG. 10 is applied to this case as well.

Next, a description will be given of the control process executed by the present embodiment with reference to FIG. 10. As can be understood from the fact that the final step S9-7 in FIG. 9 corresponds to a starting step S10-1 in FIG. 10, the present control process can be regarded as a continuation of the FIG. 9 control process. The controller 205 executes an offline job in response to depression of the start key 503 in FIG. 6 (step S10-1) and then determines whether or not the job has been completed (step S10-2). Then, the controller 205 determines whether or not an instruction for terminating offline job input operation has been issued by the user (step S10-3). In the illustrated example, when an instruction for transition to a screen other than the manual configuration screen in FIG. 7 is issued, it is determined that the instruction for terminating offline job input operation has been issued.

If the instruction for terminating offline job input operation has not been issued, the controller 205 checks whether or not an instruction for starting execution of a new job for carrying out only post processing has been issued (step S10-6). If the instruction for starting execution of a new offline job has been issued, the process returns to the step S10-1 and starts the same control as described above. On the other hand, if it is determined in the step S10-3 that the instruction for terminating offline job input operation has been issued, the controller 205 checks whether or not there exists a currently suspended inline job (step S10-4). If a currently suspended inline job exists, the controller 205 controls the printing system 1000 to resume the inline job (step S10-5).

It should be noted that in the present embodiment, in one of at least two cases described below, the process proceeds from the step S10-3 to the step S10-4 and the controller 205 controls the printing system 1000 to perform processing for a suspended inline job.

[Case 1] A case where the controller 205 determines in the step S10-6 that the instruction for starting execution of a new offline job has not been input via the start key 503 even when a predetermined time period (e.g. one minute) has elapsed after completion of the processing of one offline job.

[Case 2] A case where in response to a predetermined user operation, such as depression of a cancel button on the UI in FIG. 7, the display of the operating section 204 returns from the screen, shown in FIG. 7, for receiving a request for execution of an offline job to a UI screen (e.g. the screen in FIG. 11 or 6) for receiving a request for execution of an inline job, and the controller 205 determines in the step S10-3 that the display of the operating section 204 has returned to the screen associated with the inline job.

In the above-described case 2, the controller 205 gives an affirmative answer to the question of the step S10-3, and the process proceeds to the step S10-4. On the other hand, in the above-described case 1, the controller 205 gives a negative answer to the question of the step S10-6, and the process similarly proceeds to the step S10-4.

As described above, the printing system 1000 is configured to be capable of receiving a request for execution of an offline job requiring post processing by a sheet processing apparatus 200 connected to the printing apparatus 100, without requiring printing by the printing apparatus 100. Further, the printing system 1000 is configured to be capable of receiving a request for execution of an inline job requiring the post processing by the sheet processing apparatus 200 after execution of printing by the printing apparatus 100.

Upon reception of the request for execution of the offline job, the controller 205 controls the printing system 1000 such that printing by the printing apparatus is not executed by the offline job, but the sheet processing apparatus 200 can perform post processing on a printout prepared in advance for the offline job. On the other hand, upon reception of the request for execution of the inline job, the controller 205 controls the printing system 1000 such that the sheet processing apparatus 200 can perform post processing in the inline job after execution of printing by the printing apparatus 100.

Then, the controller 205 checks whether or not the manual configuration button 713 for use in inputting the instruction for causing the printing system 1000 to execute an offline job received later prior to an inline job received earlier has been operated. Then, if the controller 205 determines that the instruction has been input by the button operation of the manual configuration button 713, the controller 205 controls the printing system 1000 such that the sheet processing apparatus 200 executes the subsequent offline job, prior to one or more inline jobs currently being processed or awaiting processing for which respective execution requests were received earlier than for the offline job.

In the present embodiment, in cases which do not correspond to either of above-described [Case 1] and [Case 2], the process returns to the step S10-1 via the step S10-6 without proceeding to the step S10-4. More specifically, the controller 205 performs control such that an inline job will not be started even after termination of post processing required for the offline job, so long as the predetermined time period elapses. This enables the printing system 1000 to repeatedly carry out post processing required for one offline job multiple times, or to execute a plurality of offline jobs continuously one after another.

Further, in [Case 2], a next screen can be selectively displayed on the operating section 204. More specifically, the user interface screen for setting processing conditions for an inline job (e.g. the UI shown in FIG. 6 or 11) and the user interface screen for setting processing conditions for an offline job (e.g. the UI shown in FIG. 7) can be selectively displayed. In the present embodiment, this screen control is also performed by the controller 205. It should be noted that a first user interface screen of the present invention corresponds to the UI screen shown in FIG. 6 or 11, and a second user interface screen corresponds to the UI screen shown in FIG. 7.

As described hereinabove, the controller 205 performs control such that at least an inline job operation will not be started during display of the second user interface screen (e.g. the UI shown in FIG. 7) of the interface screens. Then, when display of the second user interface screen is terminated, the inline job operation is permitted to be started. In the present embodiment, this control is also performed by the controller 205.

Further, the printing system 1000 according to the present embodiment is configured to be capable of collectively handling a plurality of inline jobs and sequentially executing these jobs. In the present embodiment, the controller 205 is also equipped with the function of managing a plurality of inline jobs such that they can be collectively handled.

Thus, the printing system 1000 is controlled by the controller 205 as described above. More specifically, the controller 205 controls the printing system 1000 such that a plurality of inline jobs input earlier than an offline job and being currently processed or awaiting processing can be collectively suspended, and the inline jobs can be returned from the suspended state so as to be sequentially executed in their original execution order.

The scheduling function of collectively suspending a plurality of inline jobs because of one or more offline jobs or collectively returning the inline jobs to their former states is also realized by the controller 205. With the above-described configuration, the controller 205 performs control such that the sheet processing apparatus 200 can continuously execute a plurality of offline jobs prior to a plurality of inline jobs.

It should be noted that in [Case 2], the cancel button provided on the UI screen in FIG. 7 is used to input an instruction for canceling an offline mode for executing offline jobs. Of course, the instruction may be received from another operation instructing unit.

If the system is configured such that the instruction for canceling the offline mode for executing offline jobs can be received via the user interface as described above, this can be applied to various configurations of the control process. Further, upon reception of this instruction, the printing system 1000 according to the present embodiment gives an affirmative answer to the question of the step S10-3. With this configuration, the controller 205 determines, based on the instruction, that the offline mode has been canceled, and controls the printing system 1000 such that the inline jobs can be sequentially executed.

As described above, the printing system 1000 according to the present embodiment is configured to be capable of providing a flexible and/or user-friendly mechanism that makes it possible to utilize post processing by an associated one of the sheet processing apparatuses 200 each applicable as an inline finisher connected to the printing apparatus 100, without requiring printing by the printing apparatus 100. Further, the printing system 1000 is configured to be capable of providing a mechanism that makes it possible to efficiently process both jobs requiring post processing after execution of printing (i.e. inline jobs) and jobs requiring post processing without requiring printing (i.e. offline jobs).

Thus, the printing system 1000 according to the present embodiment, which is configured as above, realizes the above-described various types of control. As a consequence, it is possible to prevent occurrence of a new trouble that the productivity of an inline job is wastefully reduced e.g. due to the capability of processing an offline job.

The above-exemplified configuration enables the printing system 1000 to provide a mechanism that makes it possible to process offline jobs and inline jobs with high productivity.

It should be noted that the present invention may be applied to a system comprising a plurality of apparatuses or a unit formed by a single apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g. computer-readable medium).

The present invention is not limited to the embodiment exemplified in FIGS. 1 to 11, but a lot of variations (including well-organized combinations of the embodiments of the present invention) are possible based on the subject matter of the present invention, and they should not be excluded from the scope of the present invention.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-221788 filed Aug. 29, 2008, which is hereby incorporated by reference herein in its entirety.

What is claimed is:

1. A printing system that includes a printing apparatus having a printing unit that prints an image on a sheet, and a sheet processing apparatus disposed at a downstream side of the printing apparatus in a sheet conveying direction and configured to perform a stapling process on a sheet conveyed from the printing apparatus and on a sheet not conveyed from the printing apparatus, the printing system comprising:
an accepting unit configured to accept a predetermined operation from a user; and
a control unit configured to:
restrict execution of printing by the printing unit in a case where the stapling process on a sheet not conveyed from the printing apparatus is to be performed;
stop restricting execution of printing by the printing unit in a case where the predetermined operation is accepted by the accepting unit; and
stop restricting execution of printing by the printing unit in a case where a predetermined time has elapsed even when the predetermined operation is not accepted by the accepting unit.

2. The printing system according to claim 1, wherein after the sheet processing apparatus performs the stapling process on a sheet not conveyed from the printing apparatus, the sheet processing apparatus is configured to perform another stapling process on a sheet not conveyed from the printing apparatus before the control unit stops restricting execution of printing by the printing unit.

3. The printing system according to claim 1, wherein the control unit is configured to suspend a job in a case where performing the stapling process on a sheet not conveyed from the printing apparatus is instructed.

4. The printing system according to claim 3, wherein, in response to the control unit stopping restricting execution of printing by the printing unit, the printing unit is configured to start printing an image on a sheet according to the suspended job.

5. The printing system according to claim 1, wherein a sheet not conveyed from the printing apparatus is conveyed from an inserter located at a downstream side of the printing apparatus.

6. A method of controlling a printing system including a printing apparatus having a printing unit that prints an image on a sheet, and a sheet processing apparatus disposed at a downstream side of the printing apparatus in a sheet conveying direction and configured to perform a stapling process on a sheet conveyed from the printing apparatus and on a sheet not conveyed from the printing apparatus, the method comprising the steps of:

- accepting a predetermined operation from a user;
- restricting execution of printing by the printing unit in a case where the stapling process on a sheet not conveyed from the printing apparatus is to be performed;
- stopping restricting execution of printing by the printing unit in a case where the predetermined operation is accepted in the accepting step; and
- stopping restricting execution of printing by the printing unit in a case where a predetermined time has elapsed even when the predetermined operation is not accepted in the accepting step.

7. A non-transitory computer-readable storage medium storing a program executable by a computer to execute a method of controlling a printing system that includes a printing apparatus having a printing unit that prints an image on a sheet, and a sheet processing apparatus disposed at a downstream side of the printing apparatus in a sheet conveying direction and configured to perform a stapling process on a sheet conveyed from the printing apparatus and on a sheet not conveyed from the printing apparatus, the method comprising the steps of:

- accepting a predetermined operation from a user;
- restricting execution of printing by the printing unit in a case where the stapling process on a sheet not conveyed from the printing apparatus is to be performed;
- stopping restricting execution of printing by the printing unit in a case where the predetermined operation is accepted in the accepting step; and
- stopping restricting execution of printing by the printing unit in a case where a predetermined time has elapsed even when the predetermined operation is not accepted in the accepting step.

* * * * *